(12) United States Patent
Okamoto

(10) Patent No.: US 6,299,768 B1
(45) Date of Patent: Oct. 9, 2001

(54) MAGNETIC TREATMENT APPARATUS FOR WATER

(75) Inventor: Shozo Okamoto, Okayama (JP)

(73) Assignee: Business Center Organization Co., Ltd., Okayama (JP)

( * ) Notice: Subject to any disclaimer, the term of this patent is extended or adjusted under 35 U.S.C. 154(b) by 0 days.

(21) Appl. No.: 09/292,399

(22) Filed: Apr. 15, 1999

(30) Foreign Application Priority Data

Apr. 23, 1998 (JP) .................................................. 10-129589

(51) Int. Cl.[7] ................................................... B01D 35/06
(52) U.S. Cl. ............................................. 210/222; 210/695
(58) Field of Search ................................. 210/222, 223, 210/695; 123/536, 538

(56) References Cited

U.S. PATENT DOCUMENTS

| | | | |
|---|---|---|---|
| 3,680,705 | * 8/1972 | Happ et al. | 210/222 |
| 3,923,660 | * 12/1975 | Kottmeier | 210/222 |
| 4,289,621 | * 9/1981 | O'Meara, Jr. | 210/222 |
| 4,505,815 | * 3/1985 | Lindler | 210/223 |
| 4,515,692 | 5/1985 | Chandler et al. | 210/278 |
| 4,532,040 | * 7/1985 | Meeks et al. | 210/222 |
| 5,043,063 | * 8/1991 | Latimer | 210/222 |
| 5,468,373 | 11/1995 | Chou | 210/94 |
| 5,863,404 | * 1/1999 | Fujimaki . | |
| 5,871,642 | * 2/1999 | Meeks | 210/222 |
| 5,882,514 | * 3/1999 | Fletcher | 210/223 |

* cited by examiner

Primary Examiner—Matthew O. Savage
Assistant Examiner—Marianne Ocampo
(74) Attorney, Agent, or Firm—Michael D. Bednarek; Shaw Pittman LLP

(57) ABSTRACT

A magnetic treatment apparatus for magnetically activating water is provided. The apparatus includes an upstream connector, a housing, a downstream connector and a magnetic unit. The magnetic unit is accommodated within a magnetic treatment passage formed in the housing. The upstream connector and the downstream connector are provided with a water inlet passage and a water outlet passage, respectively. Both of the water passages are in communication with the magnetic treatment passage of the housing. The magnetic unit includes a plurality of magnet holding pipes extending along the magnetic treatment passage. Each of the magnet holding pipes hermetically contains a plurality of disk-shaped permanent magnets, so that water to be treated will not come into contact with the permanent magnets.

20 Claims, 7 Drawing Sheets

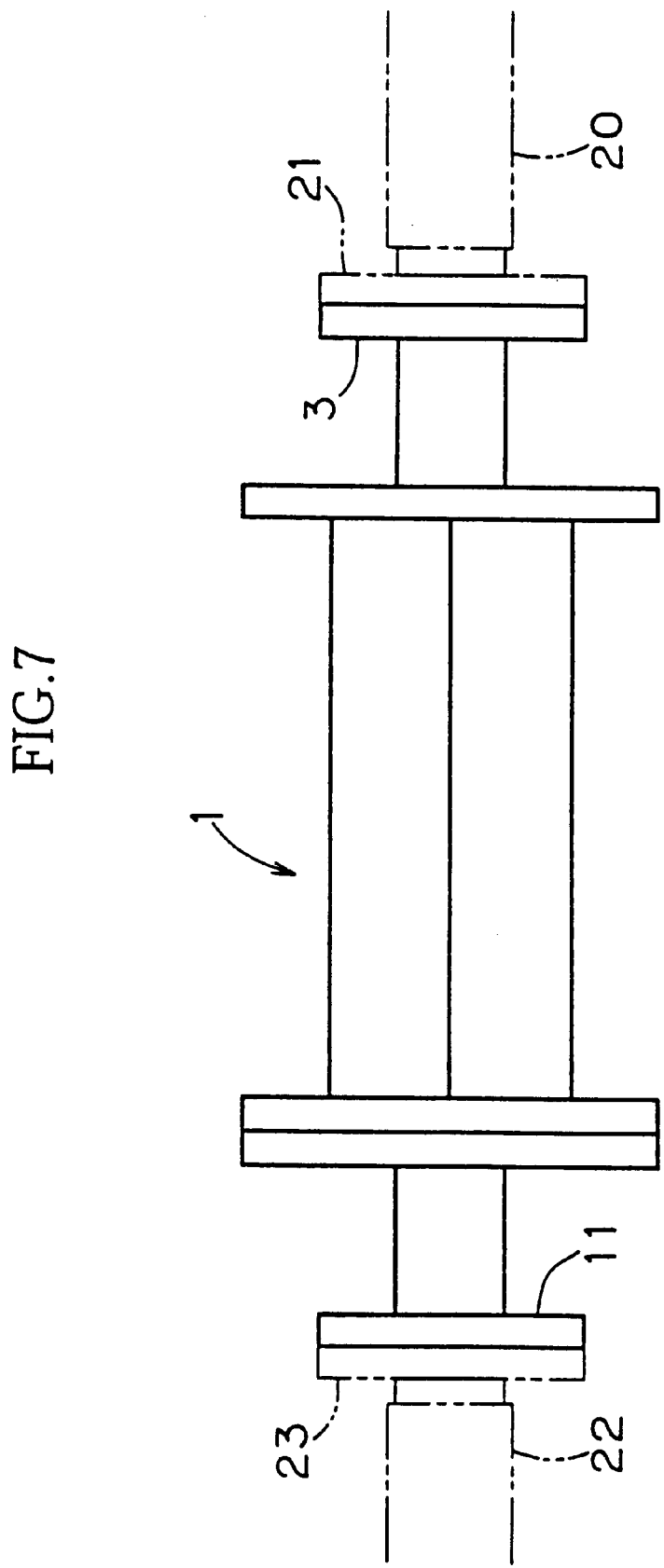

MAGNETIC TREATMENT APPARATUS FOR WATER

BACKGROUND OF THE INVENTION

1. Field of the Invention

The present invention relates to a magnetic treatment apparatus used for magnetically activating water by exposing water to a magnetic field.

2. Description of the Related Art

It is widely known that water, when exposed to a magnetic field, will be activated. This is because the magnetic radiation makes molecule groups of water become smaller. Such an magnetic treatment is advantageous since the treated water gives an improved taste while also preventing the forming of rust and/or scale.

Conventionally, various types of magnetic treatment apparatus have been proposed. However, these conventional apparatus usually have complicated inner arrangements, so that water flow may be hindered in the apparatus. Under these circumstances, unfavorable fur will often be generated in a region where the water is stagnant, thereby making the apparatus unhygienic.

Further, it is difficult to clean the inside of the conventional apparatus due to their complicated arrangements. It is also a problem that water to be treated is arranged to come into direct contact with permanent magnets of the apparatus. Clearly, such an arrangement is not favorable in terms of hygiene. Also, the magnetic force of the permanent magnets will unduly be weakened due to the direct contact with the water. As a result, water conditions in the conventional apparatus may become worse.

SUMMARY OF THE INVENTION

It is, therefore, an object of the present invention is to provide a magnetic treatment apparatus which eliminates or reduces the above-described problems.

According to the present invention, there is provided a magnetic treatment apparatus for magnetically activating water comprising:

an upstream connector formed with a water inlet passage extending therethrough, the water inlet passage having a first cross-sectional area;

a housing formed with a magnetic treatment passage which extends through the housing and is in communication with the water inlet passage, the magnetic treatment passage having a second cross-sectional area;

a downstream connector formed with a water outlet passage which extends through the downstream connector and is in communication with the magnetic treatment passage, the water outlet passage having a third cross-sectional area; and a magnetic unit releasably accommodated in the housing, the magnetic unit including at least one magnet holding pipe extending along the magnetic treatment passage, the magnet holding pipe hermetically containing a plurality of permanent magnets.

According to a preferred embodiment, the second cross-sectional area may be greater than each of the first and the third cross-sectional areas. In this manner, water passing through the magnetic treatment passage per unit time can be equal in amount to water passing through each of the water inlet passage and the water outlet passage per unit time.

Preferably, the permanent magnets may be in a disk-like shape. Any adjacent ones of the permanent magnets may be held in contact with each other via unlike poles (namely, North pole and South pole).

According to the preferred embodiment, the magnet holding pipe may contain a plurality of positioning members between which the permanent magnets are disposed.

Advantageously, the magnetic unit may include a plurality of magnet holding pipes which extend along the magnetic treatment passage and are spaced from each other by a constant distance. In this arrangement, treated water can uniformly be exposed to the magnetic field produced by the magnetic unit.

According to the preferred embodiment, each of the magnet holding pipes may hermetically contain a plurality of disk-like permanent magnets, so that the disk-like magnets will not come into contact with water.

With such an arrangement, it is possible to prevent rust from forming within the magnetic treatment apparatus, so that the treated water will not become foul. Further, the permanent magnets are prevented from decreasing in magnetic force.

Preferably, any one of the permanent magnets in a selected one of the magnet holding pipes may be located adjacent to a counterpart permanent magnet in another one of the magnet holding pipes, wherein the North-pole surfaces of said any one of the permanent magnets and said counterpart permanent magnet are arranged to face in opposite directions.

According to the preferred embodiment, each of the magnet. holding pipes has a fourth cross-sectional area, and each of the first and the third cross-sectional areas may be rendered equal to a difference between the second cross-sectional area and a sum of the fourth cross-sectional areas of the magnet holding pipes.

With such an arrangement, water to be treated will be caused to flow smoothly (i.e, without becoming stagnant) through the magnetic treatment apparatus.

Preferably, the magnetic treatment apparatus of the present invention may further comprise horizontal connection bars and vertical connection plates for keeping the magnet holding pipes in place within the housing.

In the above instance, each of the magnet holding pipes may be provided at its ends with fixing members each of which is formed with a through-hole for permitting insertion of one of the horizontal connection bars.

The horizontal connection bars may be supported by the vertical connection plates in a manner such that the connection bars are vertically spaced from each other at regular intervals.

According to the preferred embodiment, the housing has a hexagonal cross section. In this manner, the magnet holding pipes can be reliably fixed in position via the horizontal connection bars and the vertical connection plates (see FIG. 4 of the accompanying drawings).

Preferably, the upstream connector may be integrally formed with the housing. On the other hand, the downstream connector may be releasably attached to the housing. In this arrangement, when the downstream connector is detached from the housing, the magnetic unit can be put into or taken out of place with respect to the housing (i.e., be releasably held in position within the housing).

Other objects, features and advantages of the present invention will become clearer from the detailed description of preferred embodiments given below with reference to the accompanying drawings.

BRIEF DESCRIPTION OF THE DRAWINGS

In the accompanying drawings:

FIG. 7 is a side view showing a connecting arrangement of a supply pipe and an outlet pipe attached to the magnetic treatment apparatus of FIG. 1.

DETAILED DESCRIPTION OF THE PREFERRED EMBODIMENTS

Figure 1:
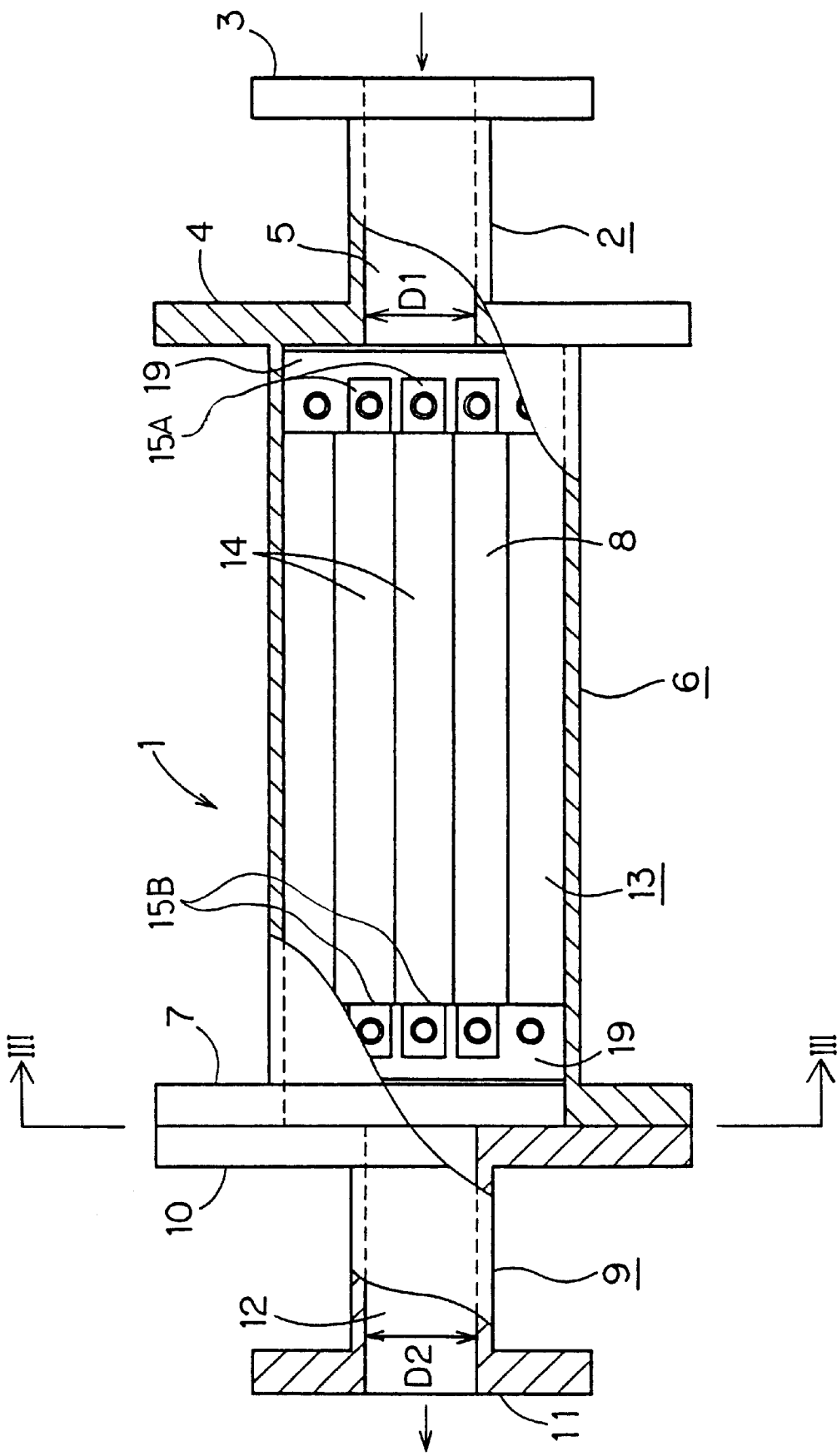
FIG. 1 is a side view showing, partially in section, a magnetic treatment apparatus for magnetically activating water according to the present invention.

The preferred embodiment of the present invention will be described below with reference to the accompanying drawings.

Reference is first made to FIGS. 1–4 showing a magnetic treatment apparatus for magnetically activating water according to the present invention. Basically, the illustrated apparatus 1 includes an upstream connector 2, a housing 6, a downstream connector 9 and a magnetic unit 13. These elements are made of a nonmagnetic material such as stainless steel.

Figure 2:
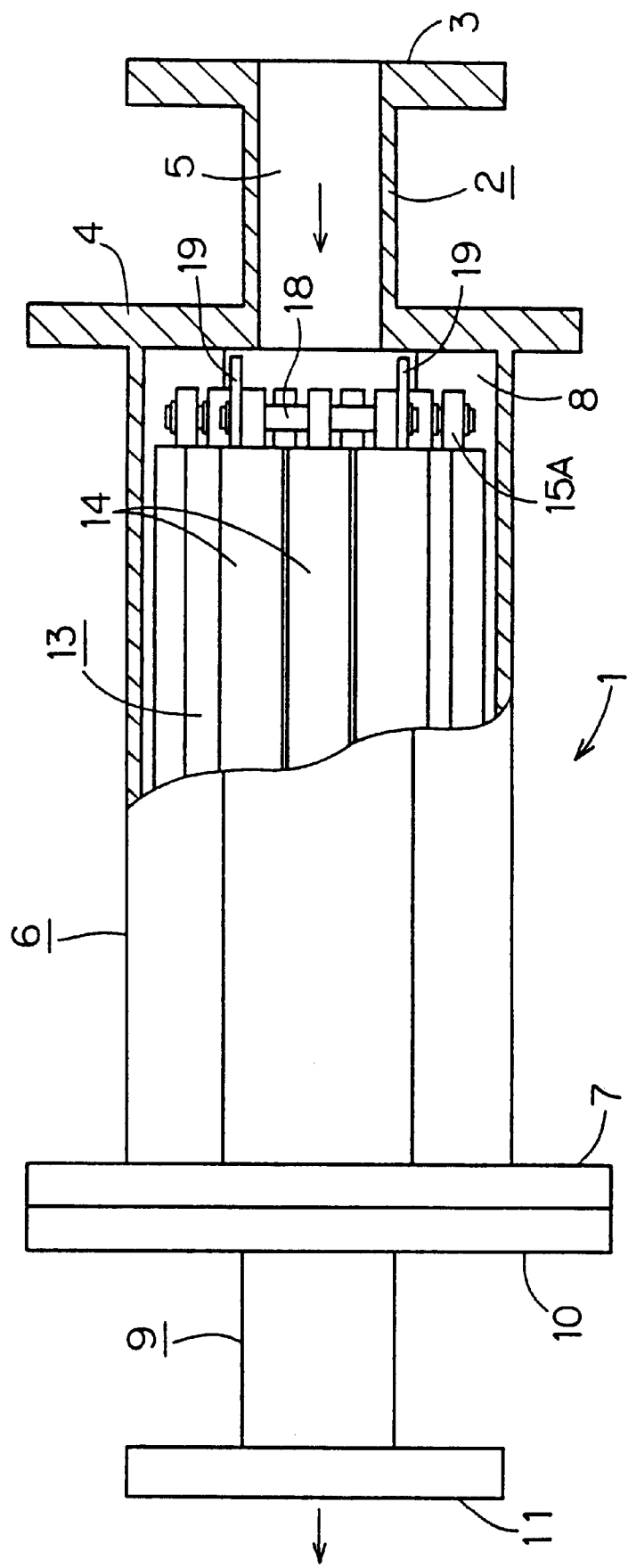
FIG. 2 is a plan view showing, partially in section, the magnetic treatment apparatus of FIG. 1.
Figure 3:
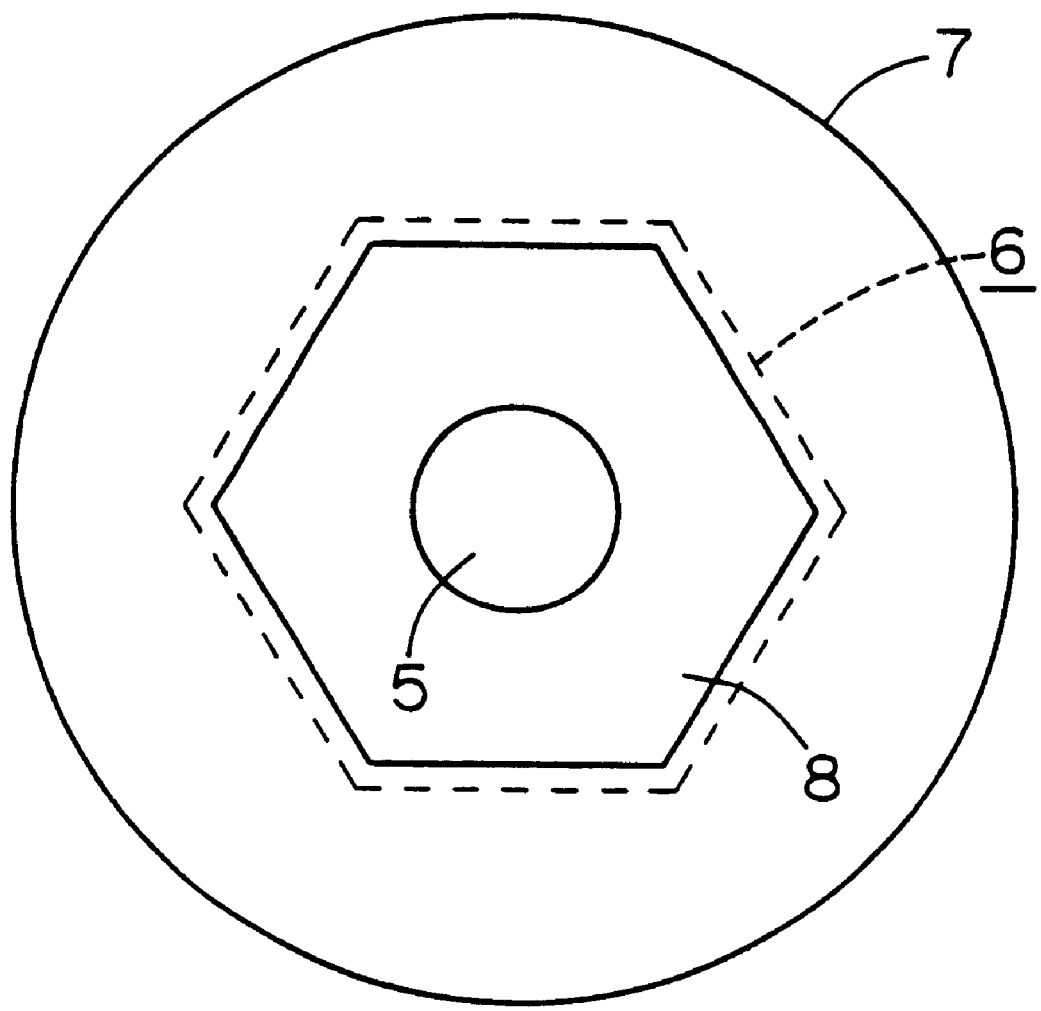
FIG. 3 is a view taken along lines III—III in FIG. 1, with a magnetic unit being removed.

As shown in FIGS. 1 and 2, the upstream connector 2 is integrally connected to the housing 6. The upstream connector 2 is provided, at one end, with a diametrically smaller first flange 3 and, at the other end, with a diametrically larger second flange 4. The first flange 3 is spaced away from the housing 6, whereas the second flange 4 is arranged adjacent to the same housing. A water inlet passage 5 is formed to extend through the upstream connector 2. As shown in FIG. 1, the water inlet passage 5 has a predetermined diameter D1 (consequently, a predetermined cross-sectional area).

The housing 6 is an elongated, hollow member which has a hexagonal cross section (see FIG. 4) and is arranged to accommodate the magnetic unit 13. As will be described later, the magnetic unit 13 is releasably held in place within the housing 6. As illustrated, the housing 6 is formed with a third flange 7 at an end opposite to the second flange 4. The third flange 7 is equal in diameter to the second flange 4. A magnetic treatment passage 8 is formed to extend through the housing 6. The magnetic treatment passage 8 has a hexagonal cross section (FIG. 4) and is in communication with the water inlet passage 5. The magnetic treatment passage 8 has a predetermined cross-sectional area which is greater than that of the water inlet passage 5.

The downstream connector 9 is formed with a fourth flange 10 which is equal in diameter to the third flange 7. The fourth flange 10 is releasably fixed to the third flange 7 by suitable fixing means (not shown). The downstream connector 9 is also formed with a fifth flange 11 which is diametrically smaller than the fourth flange 10. A water outlet passage 12 is provided to extend through the downstream connector 9. The water outlet passage 12 has a predetermined diameter D2 (consequently, a predetermined cross-sectional area) and is in communication with the magnetic treatment passage 8.

The magnetic unit 13 includes a plurality of elongated magnet holding pipes 14 each of which is arranged to extend along the magnetic treatment passage 8. In other words, each magnet holding pipe 14 extends in parallel to the flow of water moving through the magnet treatment passage 8.

Figure 5:
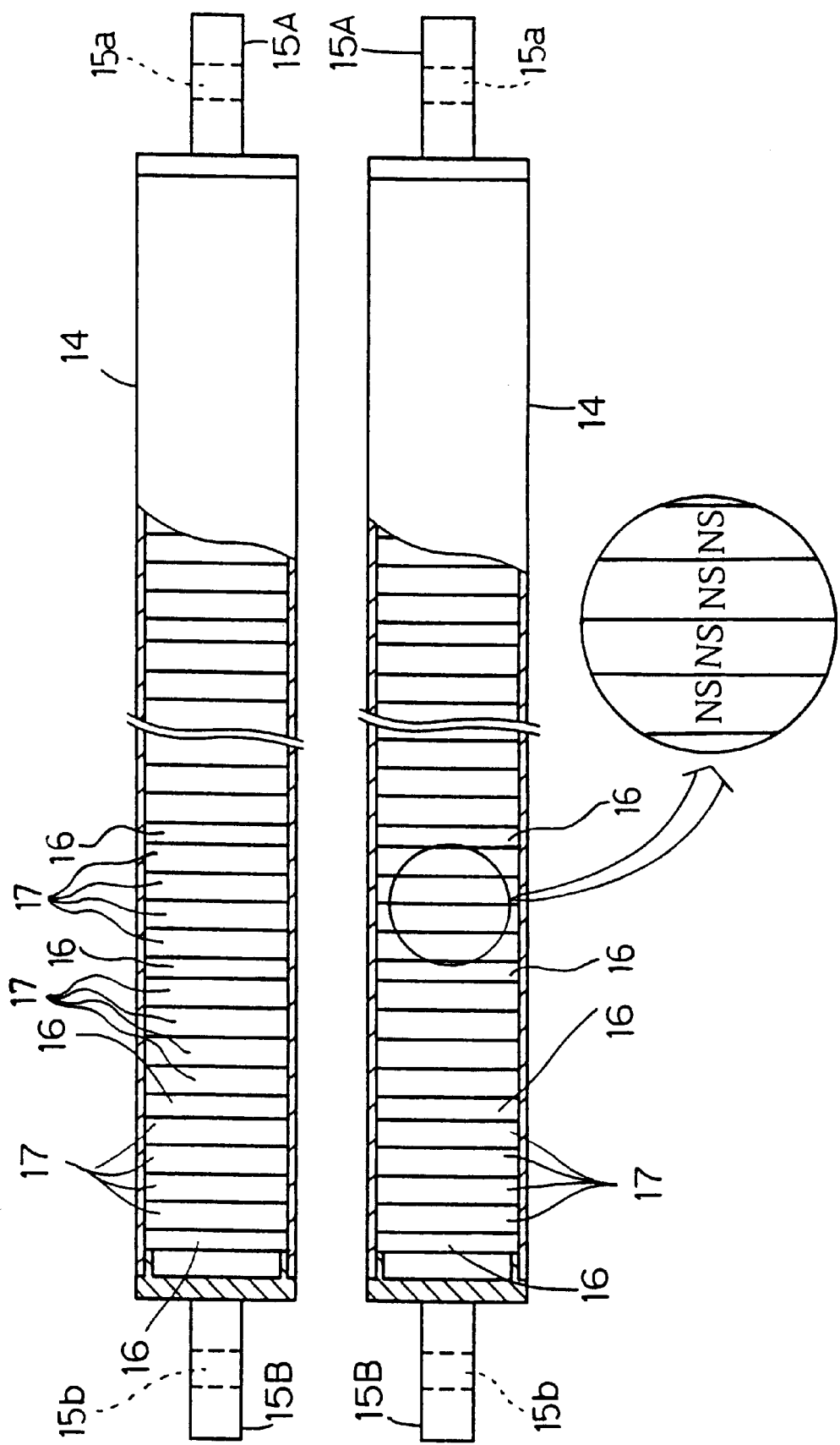
FIG. 5 is a side view showing, partially in section, magnet holding pipes.

Referring now to FIG. 5, each of the magnet holding pipes 14 is provided, at its ends, with a front fixing member 15A and a rear fixing member 15B. The front fixing member 15A is formed with a through-hole 15a while the rear fixing member 15B with a through-hole 15b.

As illustrated in FIG. 5, each of the magnet holding pipes 14 hermetically contains a plurality of disk-shaped permanent magnets 17 sandwiched between disk-shaped positioning members (or yokes) 16. Each of the magnets 17 has a North-pole surface and a South-pole surface which is opposite to the North-pole surface. More specifically, the disk-shaped permanent magnets 17 in each magnet holding pipe 14 are divided into a predetermined number of groups. In the illustrated embodiment, each group includes four permanent magnets 17 (the number of the magnets 17 is not limited to this example) The four magnets 17 are sandwiched between two positioning members 16. In each group, any two adjacent magnets 17 are held in contact with each other via the unlike pole surfaces (namely, the North-pole and South pole surfaces).

Figure 4:
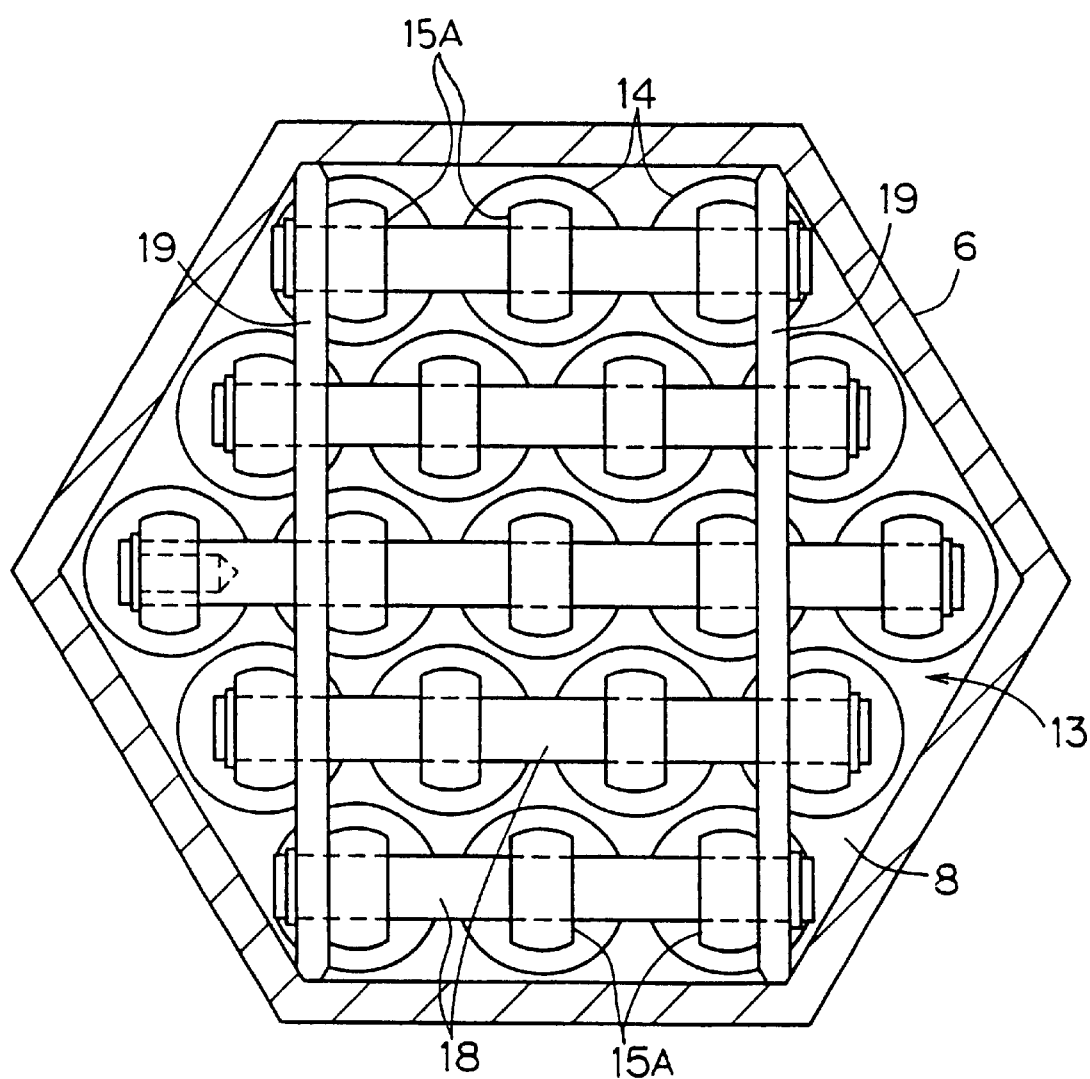
FIG. 4 is a front view showing the magnetic unit.

According to the preferred embodiment, use is made of nineteen (19) magnet holding pipes 14, as can be seen from FIG. 4. These magnet holding pipes are held in position by ten horizontal rods 18 and four vertical connection plates 19 in a manner described below.

Specifically, the magnet holding pipes 14 are supported by five horizontal rods 18 at one end via the front fixing members 15A and by another five horizontal rods (not shown) at the other end via the rear fixing members 15B.

As shown in FIG. 4, the five connection bars 18 are vertically spaced from each other at regular intervals while extending through the through-holes 15a of the front fixing members 15A. Similarly, the other non-illustrated connection bars are vertically spaced from each other at the same regular intervals while extending through the through-holes 15b of the rear fixing members.

For keeping the horizontal connection bars 18 in place, as shown in FIG. 4, use is made of two vertical connection plates 19 near the front fixing members 15A. Though not illustrated, another two vertical connection plates are provided near the rear fixing members 15B for positioning the other half of the horizontal connection bars. 18. As can be seen from FIGS. 2 and 4, the horizontal connection bars 18 extend through the vertical connection plates 19 and are fixed thereto by suitable fixing means such as removable pins or screws.

In the illustrated embodiment, as shown in FIG. 4, the uppermost horizontal connection bar 18 supports three magnet holding pipes 14 (which will be referred to as "magnet holding: pipes in the first row" hereinafter). Similarly, the second highest horizontal connection bar, which is arranged immediately under the uppermost connection bar, supports four magnet holding pipes ("magnet holding pipes in the second row"), the intermediate horizontal connection bar supports five magnet holding pipes ("magnet holding pipes in the third row"), the second lowest horizontal connection bar supports four magnet holding pipes ("magnet holding pipes in the fourth row"), and thus lowest horizontal connection bar supports three magnet holding pipes ("magnet holding pipes in the fifth row"). The magnet holding pipes 14 in each row are spaced from each other at regular intervals. Further, as shown in FIGS. 1 and 2, each magnet holding pipe 14 extends in a direction where the water to be processed is caused to flow within the magnetic treatment passage 8.

As viewed in cross section of the magnetic treatment passage 8 (see FIG. 6), the permanent magnets 17 contained by the magnet holding pipes 14 in each row are arranged in a manner such that unlike poles of these magnets appear alternately. Specifically, the uppermost three magnets 17 (or the magnets in the first row) are arranged so that North pole, South pole and North pole appear in this order as viewed from left to right.

Likewise, the four permanent magnets 17 in the second row are arranged so that South pole, North pole, South pole and North pole appear in this order. The five permanent magnets 17 in the third row are arranged so that North pole, South pole, North pole, South pole and North pole appear in this order. The four permanent magnets 17 in the fourth row are arranged so that North pole, South pole, North pole and South pole appear in this order, while the three permanent magnets 17 in the fifth row are arranged so that North pole, South pole and North pole appear in this order.

Figure 6:
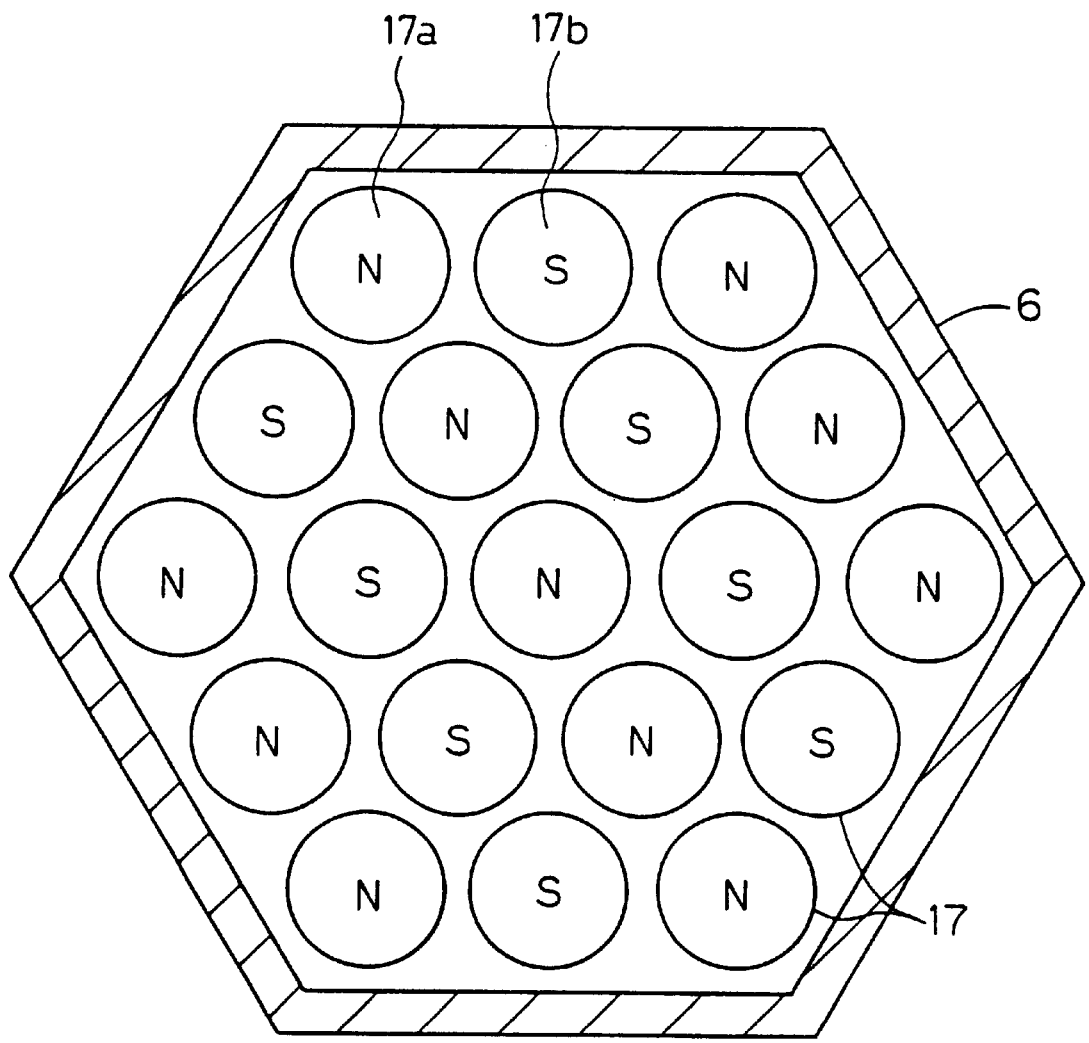
FIG. 6 illustrates an arrangement of the magnetic poles of the magnetic unit.

In other words, any one of the permanent magnets in a selected one of the magnet holding pipes is located adjacent to a counterpart permanent magnet in another one of the magnet holding pipes, wherein the North-pole surface of the above-mentioned any one of the permanent magnets and the North-pole surface of the counterpart permanent magnet are arranged to face in opposite directions. For instance, as shown in FIG. 6, the North-pole surface of a magnet 17a (an example of the above-mentioned any one of the permanent magnets) and the North-pole surface of an adjacent magnet 17b (an example of the counterpart permanent magnet) are rendered to face in the opposite directions.

According to the present invention, the magnetic unit 13 is easily put into or taken out of the housing 6 when the downstream connector 9 is detached from the housing 6.

Here, the above-mentioned magnet holding pipes 14, fixing members 15A–15B, horizontal connection bars 18 and vertical connection plates 19 are all made of a nonmagnetic material such as stainless steel.

Referring now to FIG. 7, water to be treated by the magnetic treatment apparatus 1 may be taken from a hydrant and supplied via a supply pipe 20. The supply pipe 20 is provided with a flange 21 fixed thereto, and the supply pipe flange 21 can releasably be attached to the first flange 3. Water which has been magnetically activated by the apparatus 1 will be sent through an outlet pipe 22 to a non-illustrated filtration tank or reservoir. The outlet pipe 22 is provided with a flange 23 fixed thereto, and the outlet pipe flange 23 is releasably attached to the fifth flange 11.

According to the present invention, the inner diameter D1 of the water inlet passage 5 (see FIG. 1) is made equal to the inner diameter D2 of the water outlet passage 12. Thus, the cross-sectional area of the water inlet passage 5 is equal to that of water outlet passage 12.

Further, the cross-sectional area of the water inlet passage 5 (and also the cross-sectional area of the water outlet passage 12) is rendered equal to a difference between the cross-sectional area of the magnetic treatment passage 8 and the sum of the cross-sectional areas of the respective magnet holding pipes 14.

As a result, the amount of water flowing through the magnetic treatment passage 8 per unit time becomes equal to the amount of water flowing through the water inlet passage 5 (and the water outlet passage 12) per unit time. With such an arrangement, it is possible to prevent stagnation of the water flowing in the apparatus 1.

Further, according to the present invention, water introduced via the water inlet passage 5 will be caused to flow uniformly through the magnetic treatment passage 8. In this manner, the supplied water is equally exposed to the magnetic field produced by the magnetic unit 13. As a result, the water will properly be activated.

In the illustrated embodiment, the water is caused to flow from right to left in FIG. 1. However, this direction may be reversed without compromising the advantages of the present invention.

The present invention being thus described, it is obvious that the same may be varied in many other ways. Such variations should not be regarded as a departure from the spirit and scope of the present invention, and all such modifications as would be obvious to those skilled in the art are intended to be included within the scope of the following claims.

What is claimed is:

1. A magnetic treatment apparatus for magnetically activating water comprising:

an upstream connector formed with a water inlet passage extending therethrough, the water inlet passage having a first cross-sectional area;

a housing formed with a magnetic treatment passage which extends through the housing and is in communication with the water inlet passage, the magnetic treatment passage having a second cross-sectional area;

a downstream connector formed with a water outlet passage which extends through the downstream connector and is in communication with the magnetic treatment passage, the water outlet passage having a third cross-sectional area;

a magnetic unit releasably accommodated in the housing with a water flow space formed in the magnetic treatment passage, the magnetic unit including a plurality of magnet holding pipes extending in a direction from the upstream connector towards the downstream connector arranged in a plurality of rows, each of the magnet holding pipes hermetically containing a plurality of permanent magnets and having an outer diameter, at least part of the water flow space being formed between the magnetic holding pipes for allowing the water to flow in direct contact with the magnet holding pipes; and a plurality of connection bars each for connecting a respective row of magnet holding pipes, each of the connection bars having a width smaller than the outer diameter of each magnet holding pipe to be concealed behind a respective end of each magnet holding pipe.

2. The magnetic treatment apparatus according to claim 1, wherein the plurality of magnet holding pipes are spaced from each other by a constant distance.

3. The magnetic treatment apparatus according to claim 2, wherein each of the magnet holding pipes hermetically contains a plurality of disk-like permanent magnets each of which is provided with a North-pole surface and a South-pole surface opposite to the North-pole surface.

4. The magnetic treatment apparatus according to claim 3, wherein. any one of the permanent magnets in a selected one of the magnet holding pipes is located adjacent to a counterpart permanent magnet in another one of the magnet holding pipes, the North-pole surfaces of said any one of the permanent magnets and said counterpart permanent magnet being arranged to face in opposite directions.

5. The magnetic treatment apparatus according to claim 2, further connection plates extending perpendicularly to the connection bars for connecting the connection bars together and for keeping the magnet holding pipes in place within the housing.

6. The magnetic treatment apparatus according to claim 5, wherein each of the magnetic holding pipes is provided at its ends with fixing members each of which is formed with a through-hole for permitting insertion of one of the connection bars.

7. The magnetic treatment apparatus according to claim 5, wherein the horizontal connection bars are supported by the vertical connection plates to be vertically spaced from each other at regular intervals.

8. The magnetic treatment apparatus according to claim 5, wherein each of the magnet holding pipes has a fourth cross-sectional area, each of the first and the third cross-sectional areas being equal to a difference between the second cross-sectional area and a sum of the fourth cross-sectional areas of the magnet holding pipes.

9. The magnetic treatment apparatus according to claim 1, wherein the downstream connector is releasably attached to the housing.

10. The magnetic treatment apparatus according to claim 9, wherein the magnetic unit is releasably held in position within the housing.

11. The magnetic treatment apparatus according to claim 1, wherein the second cross-sectional area is greater than each of the first and the third cross-sectional areas, so that water passing through the magnetic treatment passage per unit time is equal in amount to water passing through each of the water inlet passage and the water outlet passage per unit time.

12. The magnetic treatment apparatus according to claim 1, wherein the permanent magnets are in a disk-like shape, adjacent ones of the permanent magnets being held in contact with each other via unlike poles.

13. The magnetic treatment apparatus according to claim 1, wherein each of the magnet holding pipes contains a plurality of positioning members between which the permanent magnets are disposed.

14. The magnetic treatment apparatus according to claim 1, wherein the housing has a hexagonal cross section.

15. The magnetic treatment apparatus according to claim 1, wherein the upstream connector is integrally formed with the housing.

16. A magnetic treatment apparatus for magnetically activating water comprising:

an upstream connector formed with a water inlet passage extending therethrough, the upstream connector including an outer end for connection to a water supply pipe, the water inlet passage having a first cross-sectional area at the outer end of the upstream connector;

a housing formed with a magnetic treatment passage which extends through the housing and is in communication with the water inlet passage, the magnetic treatment passage having a second cross-sectional area;

a downstream connector formed with a water outlet passage which extends through the downstream connector and is in communication with the magnetic treatment passage, the downstream connector including an outer end for connection to a water outlet pipe, the water outlet passage having a td cross-sectional are a at the outer end of the downstream connector;

a magnetic unit releasably accomodated in the housing with a water flow space formed in the magnetic treatment passage, the magnetic unit including a plurality of magnet holding pipes extending along the magnetic treatment passage, each of the magnet holding pipes hermetically containing a plurality of permanent magnets, at least part of the water flow space being formed between the magnetic holding pipes, wherein each of the magnetic holding pipes has a fourth cross-sectional area, each of the first and the third cross-sectional areas being equal to a difference between the second cross-sectional area and a sum of the fourth cross-sectional areas of the magnet holding pipes; and a plurality of connection bars each for connecting a respective row of magnet holding pipes, each of the connection bars having a width smaller than the outer diameter of each magnet holding pipe to be concealed behind a respective end of each magnet holding pipe.

17. The magnetic treatment apparatus according to claim 16, wherein each of the magnet holding pipes hermetically contains a plurality of disk-like permanent magnets each of which is provided with a North-pole surface and a South-pole surface opposite to the North pole.

18. The magnetic treatment apparatus according to claim 17, wherein any one of the permanent magnets in a selected one of the magnet holding pipes is located adjacent to a counterpart permanent magnet in another one of the magnet holding pipes, the North-pole surfaces of said any one of the permanent magnets and said counterpart permanent magnet being arranged to face in opposite directions.

19. A magnetic treatment apparatus for magnetically activating water comprising:

an upstream connector formed with a water inlet passage extending therethrough, the water inlet passage having a first cross-sectional area;

a housing formed with a magnetic treatment passage which extends through the housing and is in communication with the water inlet passage, the magnetic treatment passage having a second cross-sectional area;

a downstream connector formed with a water outlet passage which extends through the downstream connector and is in communication with the magnetic treatment passage, the water outlet passage having a third cross-sectional area; and a magnetic unit releasably accommodated in the housing, the magnetic unit including a plurality of magnet holding pipes extending along within magnetic treatment passage, each of the magnet holding pipes hermetically containing a plurality of permanent magnets;

horizontal connection bars and vertical connection plates for keeping the magnet holding pipes in place within the housing;

wherein each of the magnet holding pipes is provided at its ends with fixing members each of which is formed with a through-hole for permitting insertion of one of the horizontal connection bars.

20. The magnetic treatment apparatus according to claim 19, wherein each of the magnet holding pipes hermetically contains a plurality of disk-like permanent magnets each of which is provided with a North-pole surface and a South-pole surface opposite to the North pole, and any one of the permanent magnets in a selected one of the magnet holding pipes is located adjacent to a counterpart permanent magnet in another one of the magnet holding pipes, the North-pole surfaces of said any one of the permanent magnets and said counterpart permanent magnet being arranged to face in opposite directions.

* * * * *